UNITED STATES PATENT OFFICE 2,046,101

SOLIDIFIED COMPOSITION

Albert Foster York, Washington, D. C., assignor to S. Sternau & Co., Inc., New York, N. Y., a corporation of New York No Drawing. Application March 18, 1932, Serial No. 599,847. Renewed October 12, 1933

4 Claims. (Cl. 44—7)

This invention relates to solidified compositions and processes of producing the same. More particularly it relates to gels having a nitrocellulose base and containing methyl or ethyl alcohol and some other organic liquid.

An object of this invention is to produce a gel or jelly which will tenaciously retain considerable quantities of any organic liquid but particularly water immiscible, non-solvents for nitrocellulose.

Another object is to produce a solidified fuel for cigarette lighters.

Another object is to produce a solidified cleaning composition.

Other objects will become apparent on reading the specification.

Hitherto organic liquids such as acetone, and in small quantities, hydrocarbons, have been incorporated in irreversible nitrocellulose solidified alcohol gels but such gels have generally contained large proportions of water and have not tenaciously retained their liquids.

It has been found that if inverted reversible nitrocellulose alcohol gels are produced, there can be incorporated tenaciously in such gels large quantities of any organic liquid, including water immiscible non-solvents for nitrocellulose which hitherto have only been incorporated in irreversible nitrocellulose alcohol gels in small amounts, for denaturing purposes.

By an inverted reversible gel is meant a gel which will form a sol on cooling and which will return to a gel on warming.

It has been found essential for the production of such a nitrocellulose alcohol gel that methyl or ethyl alcohols be present. No other alcohol than methyl or ethyl alcohol will give an inverted reversible nitrocellulose gel.

It has also been found that the ratio of water to alcohol must not exceed a certain definite amount. The exact limit can be determined by cooling a mixture of the nitrocellulose and alcohol containing given amounts of water to a low temperature, for example below −30° C. There will be found a certain definite ratio of water to alcohol beyond which a sol cannot be produced no matter how low the temperature. This will be found to be approximately one part water to 10 parts alcohol by volume for all types of nitrocellulose in either methyl or ethyl alcohol. No reversible nitrocellulose alcohol gel can contain more than this proportion of water to alcohol and so far as is known any nitrocellulose alcohol gel which contains more than this proportion of water is an irreversible gel.

It is an object of this invention not only to incorporate any organic liquid in a reversible gel but also to produce in a solidified state, preferably in reversible gels, certain compositions which are particularly suitable for cigarette lighter fuels and for other purposes requiring an easily ignitable material, or a material which will not greatly change its liquid composition on evaporation.

For such purposes the mixture of liquids having nearly the same boiling points and the mixtures of liquids which form a minimum boiling point azeotropic mixture are most satisfactory.

Examples of mixtures of liquids having around the same boiling point which are suitable for lighter fuels are methyl alcohol-ethyl ether, methyl alcohol-methyl acetate, methyl or ethyl alcohol-benzine, etc.

Ethyl alcohol-ethyl ether mixtures, although containing liquids of considerably different volatilities make fair lighter fuels when the ether is present in considerable proportions such as 50 parts ether to 50% alcohol.

The most satisfactory fuels, however, are those containing constituents which form a minimum boiling point azeotropic mixture with methyl or ethyl alcohol. Such liquids when added to the alcohol in near their azeotropic quantities will increase the vapor pressure of the mixture above that of either the alcohol or the liquid alone. In the case of benzol and a few of the other liquids this will occur even when the liquid is present in considerably less than sufficient to form the azeotropic mixture. For example, an 80% ethyl-alcohol 20% benzol mixture gives a vapor pressure which is greater than that of ethyl alcohol or of benzol. On the other hand, ethyl ether which cannot be combined with alcohol to give an azeotropic mixture will when mixed with alcohol produce a mixture having a vapor pressure lower than that of pure ether and this is true for all components which will not form an azeotropic mixture with ethyl or methyl alcohols.

The following table gives a list of minimum boiling azeotropic mixtures comprising methyl or ethyl alcohols:

*Minimum boiling point binary azeotropic mixtures containing methyl or ethyl alcohol*

| Components | | Boiling points—degrees centigrade | | | Percent A by weight in azeotropic mix |
|---|---|---|---|---|---|
| A | B | A | B | Az. mix | |
| Methylalcohol | Benzol | 64.7 | 80.2 | 58.3 | 39.5 |
| Do | n. hexane | 64.7 | 69.0 | 50.0 | 26.9 |
| Do | n. heptane | 64.7 | 98.4 | 60.5 | 62.0 |
| Do | Cyclo hexane | 64.7 | 82.7 | 55.9 | 40.0 |
| Do | do | 64.7 | 80.7 | 54.2 | 37.2 |
| Do | Methyl cyclo hexane | 64.7 | 101.8 | 60.0 | 70.0 |
| Do | Methyl acetate | 64.7 | 57.0 | 54.0 | 19.0 |
| Do | Carbon tetra chloride | 64.7 | 76.7 | 55.7 | 20.6 |
| Ethyl alcohol | Benzol | 78.3 | 80.2 | 68.2 | 32.3 |
| Do | n. hexane | 78.3 | 69.0 | 58.6 | 21.0 |
| Do | Cyclo hexane | 78.3 | 82.7 | 55.9 | 40.0 |
| Do | do | 78.3 | 80.7 | 64.9 | 30.5 |
| Do | Toluene | 78.3 | 110.6 | 76.7 | 68.0 |
| Do | Carbon tetra chloride | 78.3 | 76.7 | 65.0 | 15.7 |
| Do | Tetrachlor-ethylene | 78.3 | 120.8 | 78.0 | 81.0 |

Ethyl alcohol-water-benzol and ethyl alcohol-water-hexane also form tertiary azeotropic mixes.

Any organic liquid, however, which is soluble in alcohol may be incorporated in a reversible gel with ethyl or methyl alcohol and when so incorporated even in considerable proportions to the alcohol, it becomes a part of the gel just like the alcohol, is retained with tenacity and has no apparent effect on the reversibility of the gel.

There are three general processes of producing a reversible gel, namely (1) low temperature process and (2) modified ether-alcohol evaporation process and (3) modified water precipitation process.

The low temperature process is probably the most satisfactory method of producing a reversible gel and consists essentially in mixing the organic liquid, ethyl or methyl alcohol and nitrocellulose of a type which is incompletely soluble in the mixture at room temperature, the mixture containing less than the maximum quantity of water, subjecting the mixture to a low temperature to produce a sol and allowing the temperature to rise whereby a reversible gel is produced.

The modified ether-alcohol method consists essentially in dissolving nitrocellulose in ether-ethyl alcohol containing if desired some other organic liquid, and then evaporating off ether until a gel is formed.

The modified water precipitation method consists essentially in dissolving nitrocellulose in a liquid comprising ethyl or methyl alcohol and then adding water or a mixture of alcohol and water having a water content which will give a total water to alcohol ratio of less than the end point (about 1–10), and more than enough to make the nitrocellulose insoluble at room temperature whereupon a gel will be produced.

The following specific examples are given:

*Low temperature process*

1. Mix 20 parts by volume of benzol and 80 parts by volume of absolute ethyl alcohol and 4 parts by weight of a nitrocellulose of a type which is insoluble in absolute ethyl alcohol at room temperature (about 12% nitrogen nitrocellulose) subject the mixture to a temperature of about −30° C., with stirring until a clear sol is obtained, and then allow the temperature of the sol to rise to room temperature whereupon a gel is formed.

2. Mix 20 parts by volume of benzol and 80 parts by volume of methyl alcohol and 4 parts by weight of a nitrocellulose of a type which is insoluble in absolute methyl alcohol at room temperature (about at 13% nitrogen nitrocellulose), subject the mixture to a temperature of about −30° C. with stirring until a sol is obtained, and then allow the temperature of the sol to rise to room temperature whereupon a gel results.

3. Mix 20 parts by volume of benzol, 40 parts by volume of absolute ethyl alcohol, and 4 parts by weight of nitrocellulose of about 11.5% nitrogen content, cool the mixture to about −30° C. and mix 40 parts of 90% ethyl alcohol also cooled to −30° C., stir until a sol is obtained and then allow the temperature of the sol to rise to room temperature whereupon a gel is formed.

4. Mix 20 parts by volume of benzol and 80 parts by volume of methyl alcohol having about 4% water and 4 parts by weight of nitrocellulose of about 12.5% nitrogen content, subject the mixture to a temperature of about −30° C. with stirring until a sol is obtained and then allow the temperature of the sol to rise to room temperature whereupon a gel is obtained.

5. Mix 20 parts by volume of benzol, 40 parts by volume of methyl alcohol, 40 parts by volume of ethyl alcohol, (anhydrous or 95%) and 4 parts by weight of a nitrocellulose of a type which is insoluble in the alcohols at room temperature (about a 12% nitrogen nitrocellulose), subject the mixture to a temperature of about −30° C. with stirring until a sol is produced, and then allow the temperature of the sol to rise whereupon a gel is obtained.

6. Mix 80 parts of ordinary 95% ethyl alcohol with 4 parts of nitrocellulose of about 12% nitrogen content, cool to about −30° C. and stir for several hours until a sol is obtained. If the nitrocellulose is moistened with a solvent such as methyl or absolute ethyl alcohol before adding the 95% ethyl alcohol solution will be facilitated. Add 20 parts of benzol also cooled to −30° C. to the sol. Allow the sol to rise to room temperature, whereupon a gel is obtained.

7. Mix 50 parts by volume of gasoline, 50 parts by volume of absolute ethyl alcohol and 4 parts by weight of a nitrocellulose of a type which is insoluble in absolute ethyl alcohol at room temperature (about a 12% nitrogen nitrocellulose), subject the mixture to a temperature of about −30° C. with stirring until a sol is obtained, and then allow the temperature of the sol to rise to room temperature whereupon a gel is formed.

8. Mix 62 parts by weight of methyl alcohol with 38 parts by weight of n. heptane and 4 parts by weight of nitrocellulose of a type which is incompletely soluble in methyl alcohol at room temperature (about a 13% nitrogen nitrocellulose) subject the mixture to a temperature of about −30° C. with stirring until a sol is obtained and then allow the temperature of the sol to rise to room temperature.

9. Mix 50 parts by weight of carbon tetrachloride 50 parts by weight of absolute ethyl alcohol and 4 parts by weight of nitrocellulose of a type which is incompletely soluble or insoluble in absolute ethyl alcohol at room temperatures (about a 12% nitrogen nitrocellulose) subject the mixture to a temperature of about −30° C., with stirring until a sol is produced and then allow the temperature of the sol to rise to room temperature whereupon a gel is formed.

In a process which requires the use of large proportions of benzol and other high melting hydrocarbons it is advisable that small proportions of ether, viz. 5% by weight be mixed with the alcohol as ether will prevent the crystallizing out of such compounds at low temperatures.

*Ether-alcohol evaporation process*

Mix 20 parts by volume of benzol, 80 parts of a 2—1 ethyl alcohol ether mixture, and 4 parts by weight of a 12% nitrogen nitrocellulose and stir until a sol is obtained. Evaporate the ether until a gel is obtained. All or part of the ether may be evaporated off depending on whether a benzol alcohol gel is desired or a benzol alcohol ether gel of the "alcogas" type is desired.

*Modified water precipitation process*

1. Dissolve 4 parts of a nitrocellulose having a nitrogen content of 11.5% in 50 parts by volume of absolute ethyl alcohol. Then add by spraying into the solution or other methods 50 parts of a 90% ethyl alcohol. After a short interval a gel will be formed.

2. Dissolve 4 parts of nitrocellulose having a nitrogen content of 11.5% in 30 parts of absolute alcohol containing 20 parts of benzol. Then add, by spraying into the solution, or other methods known to the art 50 parts of 90% ethyl alcohol. After a short interval a gel will be formed.

In place of benzol other liquids such as those mentioned may be used. For those liquids such as acetone, methyl acetate, which are nitrocellulose solvents, nitrocelluloses of slightly greater nitrogen content than stated in the above examples or water in slightly greater amount than stated may have to be used in order that the nitrocellulose will be incompletely soluble at room temperature. However, if the type of nitrocellulose and water content is so regulated that this is brought about, no difficulty in producing gels will be found.

The proportion of liquids other than water to alcohol may vary in a wide range, the limiting factor being the ratio of liquid to alcohol at which nitrocellulose will separate out and the tendency toward syneresis in gels containing large proportions of liquids which are non-solvents for nitrocellulose, i. e. a gel containing 4 parts of benzol to 1 of alcohol has a greater tendency to contract and exude liquid than 1—1 mixtures.

It is advisable that the methyl or ethyl alcohol be anhydrous or nearly so for the following reasons: Water lowers the vapor pressure of alcohol and makes the fuel more difficult to ignite; water increases syneresis; in greater proportion to alcohol than about 1—10 it prevents solution of nitrocellulose in alcohol at low temperatures and so prevents formation of a gel; it decreases the solubility of hydrocarbons in alcohol especially at low temperatures thus causing a separation of the mixture into a nitrocellulose alcohol sol and hydrocarbon; and it has a tendency to separate out from alcohol hydrocarbon mixtures.

The temperatures used to effect solution by the low temperature process may vary from only slightly below room temperature to temperatures which will cause the freezing of the liquids. The lower the temperature, the greater is the solubility of the nitrocellulose in the alcohol.

Amounts of nitrocellulose of about 4% will produce a firm, strong gel. By decreasing the proportion of nitrocellulose to about ¾%, or using a nitrocellulose of such nitrogen content that it is nearly soluble in the alcohol at room temperature, it is possible to produce a flowing gel. Such gels show a remarkable ability to retain the liquid and may be put into deformable tubes and squeezed out without material separation of liquid.

The gels containing volatile inflammable constituents may be used either in the solid gel form or in the flowing gel form in a cigarette lighter.

The flowing gels are squeezed from tubes and may be used similarly to the tube cigarette lighting compositions now on the market.

For cleaning purposes, the firm gels may be used similarly to a cake of soap. They are rubbed on the material having the stain and the stain dissolves in the gasoline alcohol-film. Another method of use is to rub the gel in a similar manner as a gum eraser. The gel may be rubbed so it crumbles, the crumbled gel absorbing the dissolved foreign matter.

With the flowing gels the material is squeezed out of the deformable tubes onto the stained material and rubbed against the stain, the liquid film on the gel dissolving the stain and the gels themselves absorbing it.

Mixtures such as ethyl or methyl alcohols, acetone, benzene and water are intended to be incorporated in reversible gels as well as various other combinations of organic liquids with ethyl or methyl alcohols.

Various motor fuels containing methyl or ethyl alcohols such as alcogas, natalite, etc., may be solidified or incorporated into nitrocellulose gels preferably by the aforementioned processes. Such solidified fuels are particularly suitable for airplanes since they can be carried in tanks without danger of leakage inherent in liquid fuels.

Ethyl and-or methyl alcohols alone are commonly and in this specification and claims not considered motor fuels or cigarette lighter fuels. The vapor pressure of ethyl alcohol is only about ¼ that of gasoline at ordinary temperatures and the latent heat of vaporization is about 3.2 times that of gasoline. It is only when ethyl or methyl alcohols are combined with ether, benzol, gasoline, etc., that a fuel can be obtained having the characteristics of a motor fuel or cigarette lighter fuel. Such composite fuels have been known and patented but so far as known, in spite of the advantages of solidifying such mixtures, they have not been produced in such state.

It is to be further understood that the terms solvent and solution when used throughout the specification and claims are used in the general sense, for strictly speaking, nitrocellulose does not dissolve to form a solution but disperses in a dispersion medium to form a colloidal dispersion.

Also the terms insoluble and non-solvent are used in the commonly understood sense to mean respectively (1) slightly dispersible and (2) a dispersion medium in which such small amounts of material can be dispersed that such medium is considered for all practical purposes a non-solvent.

What I claim is:—

1. A nitrocellulose alcohol gel containing an azeotropic mixture of an organic compound with the alcohol.

2. A nitrocellulose methyl alcohol gel containing 68 parts methyl alcohol to 32 parts normal heptane by weight.

3. A nitrocellulose alcohol gel containing an organic compound which is capable of forming an azeotropic minimum boiling point mixture with the alcohol of said gel and which is present in approximately its azeotropic quantity.

4. A reversible nitrocellulose alcohol gel containing not more than one part of water to 10 parts of the alcohol of said gel, and containing an inflammable hydrocarbon capable of forming an azeotropic mixture with the alcohol of said gel, said hydrocarbon being present in a quantity sufficient to form a mixture having a vapor pressure higher than either the alcohol or the compound alone, the nitrocellulose being of such amount or nature as to form flowing gel.

ALBERT FOSTER YORK.